United States Patent [19]

Kanno et al.

[11] Patent Number: 4,763,212

[45] Date of Patent: Aug. 9, 1988

[54] FLOPPY DISK DRIVE WITH A LINEARLY OPERATED MEDIA CLAMP

[75] Inventors: Tetsuo Kanno, Ebina; Kazumi Tanabe, Sagamihara, both of Japan

[73] Assignee: Ricoh Company, Ltd., Tokyo, Japan

[21] Appl. No.: 52,212

[22] Filed: May 15, 1987

Related U.S. Application Data

[63] Continuation of Ser. No. 532,187, Sep. 14, 1983, abandoned.

[30] Foreign Application Priority Data

Sep. 16, 1982 [JP] Japan .............. 57-140353[U]
Oct. 1, 1982 [JP] Japan .............. 57-149608[U]
Oct. 8, 1982 [JP] Japan .............. 57-152864[U]

[51] Int. Cl.$^4$ .................. G11B 5/016; G11B 5/82
[52] U.S. Cl. ........................................ 360/99
[58] Field of Search ...................... 360/97, 99, 106

[56] References Cited

U.S. PATENT DOCUMENTS

| | | | |
|---|---|---|---|
| 4,146,912 | 5/1979 | Kukreja ............... | 360/99 |
| 4,170,146 | 10/1979 | Owens . | |
| 4,179,718 | 12/1979 | Rolph .................. | 360/99 |
| 4,205,355 | 5/1980 | Hamanaka et al. ... | 360/99 |
| 4,274,119 | 6/1981 | Hayward et al. ..... | 360/99 |
| 4,315,289 | 2/1982 | Holocek et al. ...... | 360/99 |
| 4,323,939 | 4/1982 | Iftikar et al. ......... | 360/106 |
| 4,423,447 | 12/1983 | Nishida et al. ....... | 360/106 |
| 4,456,937 | 6/1984 | Iftikar et al. ......... | 360/106 |
| 4,466,033 | 8/1984 | Jordan et al. ........ | 360/99 |
| 4,476,508 | 10/1984 | Tronzano et al. ... | 360/106 |
| 4,485,464 | 11/1984 | Shimoaka ............. | 360/97 |
| 4,599,666 | 7/1986 | Liu et al. ............. | 360/97 |
| 4,602,306 | 7/1986 | Noda .................... | 360/97 |

*Primary Examiner*—Robert S. Tupper
*Assistant Examiner*—Melissa J. Koval
*Attorney, Agent, or Firm*—Cooper & Dunham

[57] ABSTRACT

A floppy disk device includes a driving hub, a pressure cone engageable with the hub for holding a floppy disk therebetween, a leaf spring rotatably supporting the cone for pressing the cone against the hub, a cone lift arm and a door for closing or opening a slot for insertion or removal of the floppy disk. When an operator closes or opens the door, its movement is transmitted to the cone lift arm which either presses or releases the leaf spring depending upon whether the door is closed or opened. The provision of the cone lift arm as an intermediate member between the door and the leaf spring allows to produce various desirable effects. Another embodiment includes the provision of a pawl which allows to insure that the cone comes into engagement with the hub only when the floppy disk is properly aligned. A further embodiment includes the provision of a specially structured steel belt for use in transmitting driving power to a carriage carrying thereon a magnetic head for reading and writing information on the floppy disk.

15 Claims, 12 Drawing Sheets

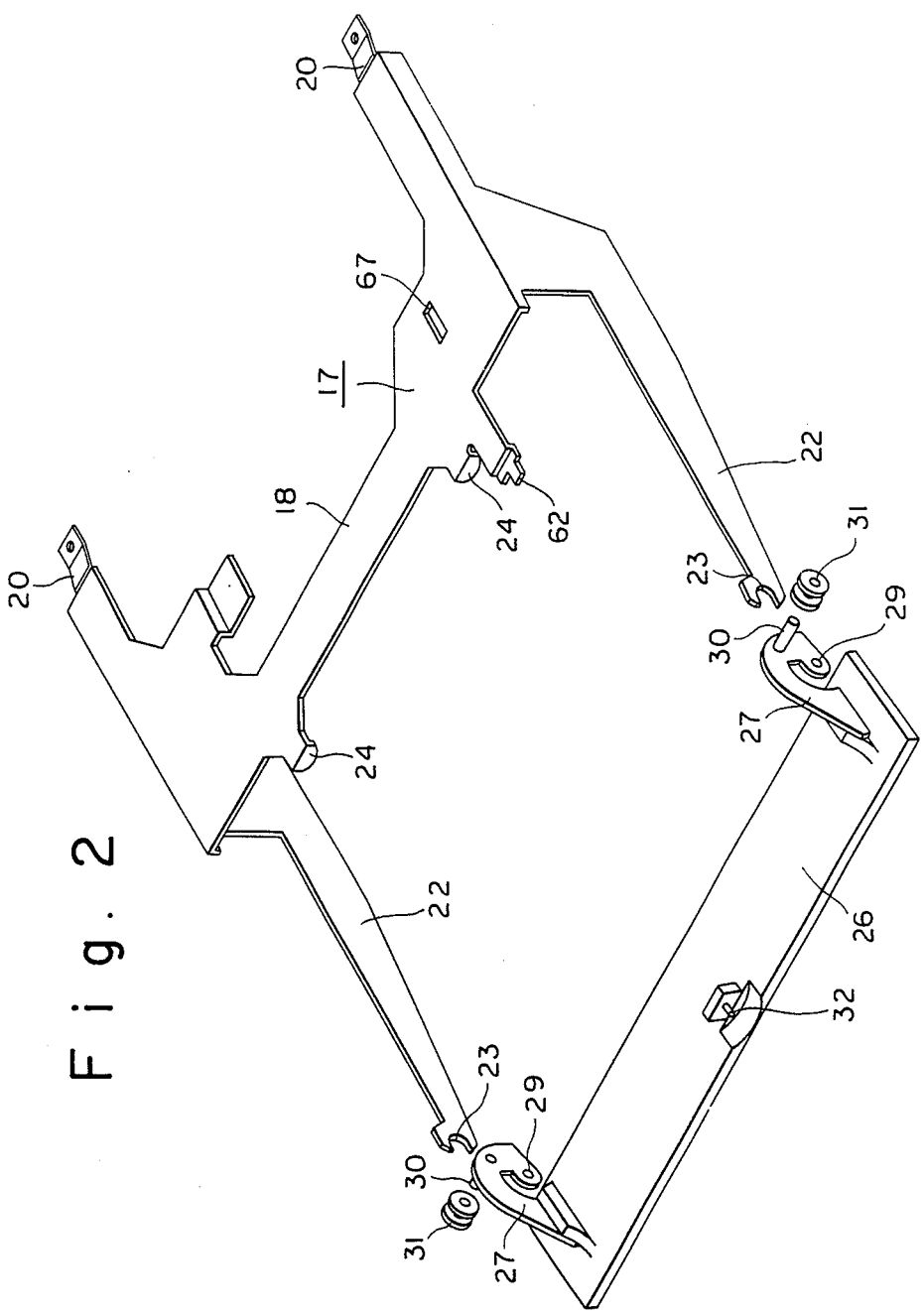

FLOPPY DISK DRIVE WITH A LINEARLY OPERATED MEDIA CLAMP

This is a continuation of application Ser. No. 532,187, filed Sept. 14, 1983, now abandoned.

BACKGROUND OF THE INVENTION

1. Field of the Invention

The present invention generally relates to memory storage devices of the type which includes at least one rotating disk as a memory storing means. More particularly, the present invention relates to rotating disk memory storage devices, normally called floppy disk drives, using a soft thin disk contained in a cover jacket for storing bits of information thereon.

2. Description of the Prior Art

In general, a floppy disk drive includes a driving hub and a pressure cone for securely holding a floppy disk therebetween, and the driving hub is driven to set the floppy disk in rotation. One typical prior art structure for holding a floppy disk for rotation, called "door bridge system", is schematically illustrated FIG. 11. As shown, this prior art structure includes a driving hub 70 which is operatively connected to a driving motor through a power transmission train (not shown) and drives a floppy disk 75 to rotate when it is securely held thereon. The floppy disk holding structure also includes a pressure cone 71 which is rotatably mounted on a door 73, which, in turn, is pivotally supported by a pin 72. In this structure, when the free end (left end in FIG. 11) is pushed downward to bring it to be in engagement with a latch 74 thereby setting the door 73 in a closed state, the cone 71 becomes pressed against the hub 70 so that the floppy disk 73 is securely held between the hub 70 and the cone 71. In such a structure, however, the door 73 has a relatively large mass, which thus requires a relatively large operating force for closing and opening the door 73. As a result, the floppy disk 75 may receive large shocks for mounting and dismounting and its overall operability is not entirely satisfactory. Furthermore, in order to cope with a large bending force imparted to the door 73, the door 73 must have a sufficient thickness especially at the portion above the floppy disk 75, and such a requirement is diametrically opposite to the recent trend of making a floppy disk drive as flat as possible.

Another typical prior art floppy disk holding structure is schematically illustrated in FIG. 12, and this structure includes a pressure cone 76 which is rotatably mounted on a leaf spring 77. Also provided is an actuating shaft 78 whose one end is off-centered and connected to the leaf spring 77 and the other end is connected to a pivotal door lever 79. In this structure, when the door lever 79 is pivoted in the direction as indicated by the arrow, the leaf spring 77 is caused to move downward through the shaft 78 thereby bringing the pressure cone 76 into pressure contact with a driving hub located therebelow. However, this structure also suffers from disadvantages of poor operability mainly due to the fact that an operator is required to pivot the door lever 79 for operation.

In addition, when it is desired to provide a driving motor in direct connection with the driving hub instead of employing a power transmission means such as a driving belt to apply a driving power to the driving hub from a motor located at a remote position, structural constraints in design become more severe because the overall device is generally required to be designed as flat as possible and movable parts such as the door 73 requires a larger stroke of movement for its enhanced operability, which apparently contradicts against the former requirement. Thus, there has also been a need to develop a new floppy disk drive which can satisfy these seemingly contradictory requirements as much as possible.

SUMMARY OF THE INVENTION

The disadvantages of the prior art are overcome with the present invention and a floppy disk drive having a novel structure is hereby provided.

It is therefore a primary object of the present invention to provide an improved floppy disk drive.

Another object of the present invention is to provide a floppy disk drive having an enhanced operability in mounting and dismounting a floppy disk onto and from the drive.

A further object of the present invention is to provide a floppy disk drive which can be designed compact in size, especially its flatness, without impairing its operability.

A still further object of the present invention is to provide a floppy disk drive capable of preventing a floppy disk from being damaged, especially its center hole.

Other objects, advantages and novel features of the present invention will become apparent from the following detailed description of the invention when considered in conjunction with the accompanying drawings.

BRIEF DESCRIPTION OF THE DRAWINGS

FIG. 2 is a perspective, exploded view showing the cone lift arm and the door of the device shown in FIG. 1;

DESCRIPTION OF THE PREFERRED EMBODIMENTS

Figure 1:
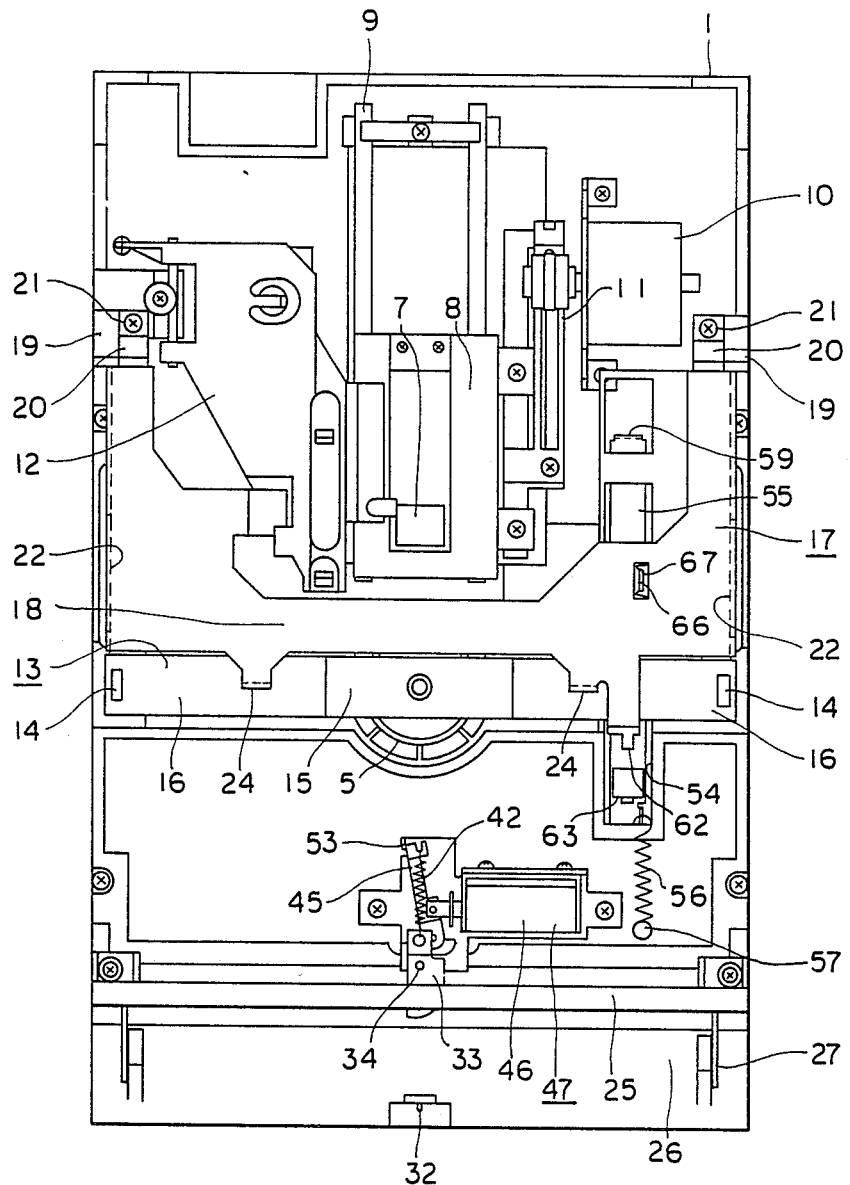
FIG. 1 is a plan view showing the structure, with its top cover removed, of the floppy disk drive constructed in accordance with one embodiment of the present invention.

Referring now to FIGS. 1-10, one embodiment of the present floppy disk drive will be described. First, describing the basic structure, the present floppy disk drive includes a main frame 1 and a D.C. motor 2 disposed at the center of and at the back side surface of the frame 1, and the motor 2 has a rotary shaft 3 on which is fixedly mounted a driving hub 4, as best shown in FIG. 4. Disposed in opposite to and above the driving hub 4 is a pressure cone 5 which may be brought into pressure contact with and separated away from the driving hub 4, as will be more fully described later. Thus, when a floppy disk 6 is placed between the driving hub 4 and the pressure cone 5 as inserted through an insertion slot provided in the floppy disk drive, the pressure cone 5 may be moved toward and brought into pressure contact with the driving hub 4 thereby allowing to securely hold the floppy disk 6 therebetween. When so mounted, the floppy disk 6 may be set in rotation by driving to rotate the hub 4. As well known in the art, the floppy disk 6 is comprised of a flexible magnetic disk capable of storing bits of information magnetically, which disk is normally contained in a jacket in the form of a square and provided with a center hole through which the cone 5 may be passed for secure holding.

As shown in FIG. 1, a magnetic read-write head 7 is provided as mounted on a carriage 8 which rides on a guide shaft 9 fixedly mounted on the frame 1 as disposed close to the rear side. The carriage 8 may move along the shaft 9 in a reciprocating manner so that the magnetic head 7 may move radially with respect to the floppy disk 6 securely held between the hub 4 and the cone 5 for rotation. In the vicinity of the guide shaft 9 is disposed a stepping motor 10 which is operatively associated with the carriage 8 through a steel belt 11. On the opposite side of the motor 10 with respect to the guide shaft 9 is disposed a head driving mechanism 12 for moving the magnetic head 7 closer to or separated away from the magnetic disk 6 securely held in position as set forth above.

As centrally shown in FIG. 1, there is provided a leaf spring 13 for supporting the pressure cone 5. The leaf spring 13 extends substantially across the width of the frame 1, and both ends of the leaf spring 13 are in engagement with bosses 14 and 14 formed on the frame 1. It is so structured that the leaf spring 13 will deflect only in the direction of moving toward or separated away from the driving hub 4. As best shown in FIG. 4, when viewed from the front, the leaf spring 13 includes a central flat portion 15 which is in parallel with the driving hub 4 and the pressure cone 5 and a pair of inclined portions 16, 16 extending downwardly from the central flat portion 15 in opposite directions. The pressure cone 5 is rotatably mounted on the central flat portion 15 at its bottom surface.

As shown in the vicinity of the leaf spring 13 in FIG. 1, there is provided a cone lift arm 17 which can cause the pressure cone 5 to be displaced toward the driving hub 4 by pressing the leaf spring 13. The cone lift arm 17 includes a base portion 18 positioned at the rear side of the leaf spring 13 and lying substantially in the same plane as that of the flat portion 15 of the leaf spring 13. The base portion 18 has projections on both ends and at the end of each projection is provided with a leaf spring 20 which is securely attached to a supporting portion 19 of the frame 1 by means of a screw 21. Thus, the cone lift arm 17 may pivotally move up and down. The base portion 18 of the cone lift arm 17 is substantially as long as the leaf spring 13, and the cone lift arm 17 includes a pair of vertical portions 22, 22 extending downward as bent from both ends of the base portion 18. These vertical portions 22, 22 extend toward the front and vicinity of an insertion slot of the present disk drive along the inside surfaces of the frame 1, as best shown in FIGS. 1 and 2. As best shown in FIG. 2, a notch 23 is formed at the tip end of each of the vertical portions 22, 22. It is to be noted that only a bottom half of such a notch 23 is required for the purpose of the present invention. A pair of pressure projections 24, 24 are integrally formed as projecting from the base portion 18 toward the front and thus over the respective inclined portions 16, 16 of the leaf spring 13. Each of the pressure projections 24, 24 has its tip end bent downward so that its tip end is in contact with the corresponding inclined portion 16 of the leaf spring 13. In the illustrated embodiment, the pair of pressure projections 24, 24 are disposed symmetrically with respect to the center of the pressure cone 5, and the tip ends of the pressure projections 24, 24 are in contact with the inclined portions 16, 16 in the middle in the widthwise direction of the leaf spring 13. It is to be noted that such a cone lift arm 17 may preferably be fabricated by press forming.

At the front side of the frame 1 is provided a front cover 25 which is formed with an insertion slot through which the floppy disk 6 may be inserted into or removed from the present disk drive, and a door 26 is pivotally provided to open or close the insertion slot. On both ends of the door 26 are fixedly mounted a pair of arc-shaped arms 27, 27 which are each provided with a hole 29 into which a stud 28 fixedly mounted on the frame 1 is fitted so that the door 26 may pivot around the studs 28, 28, as best shown in FIG. 3. A pin 30 is planted in each of the arms 27, 27, and a grooved collar 31 is fitted onto the pin 30 with the groove of each collar 31 engaged with the corresponding notch 23 of the cone lift arm 17. Also provided fixedly at the center of inner surface of the door 26 is a pin 32, which is engageable with a latch 33 disposed in the vicinity of the insertion slot for keeping the door 26 in a closed state when engaged with the pin 32.

Figure 8:
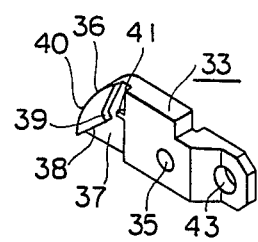
FIG. 8 is a perspective view of the latch employed in the device shown in FIG. 1.

The latch 33 has a structure as best shown in FIG. 8 and it allows the door 26 to be closed and opened in a one-way motion. Stated more in detail, the latch 33 is provided with a hole 35 which may be fitted onto a stud 34 of the frame 1 so that the latch 33 may be pivotally supported by the stud 34. The latch 33 is also provided with a curved outer peripheral surface 36 along which the pin 32 of the door 26 slides in pressure contact therewith when the door 26 is pivoted to a closed position. The latch 33 is also provided with an inner peripheral surface defined by a recess 37 formed between the hole 35 and the curved outer peripheral surface 36. The latch 33 is further provided with a latching portion 39 formed at the center of the inner peripheral surface 38 for temporarily latching the pin 32 and a sliding peripheral curved surface 40 which makes a circle on a plane including the latching portion 39. Also provided in the latch 33 is a pin detent portion 41 which projects into the recess 37 toward the latching portion 39 and a hole 43 to which one end of a spring 42 may be engaged.

Figure 7:
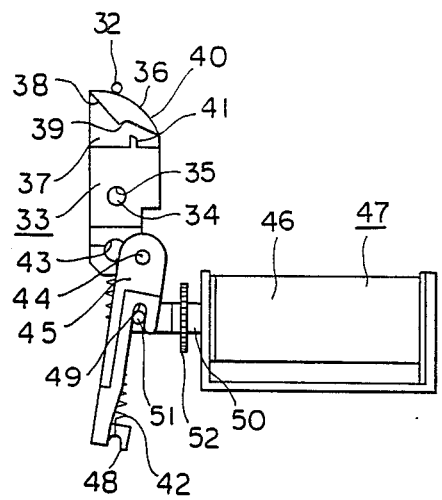
FIG. 7 is a bottom view showing the door latch mechanism of the device shown in FIG. 1.
Figure 10:
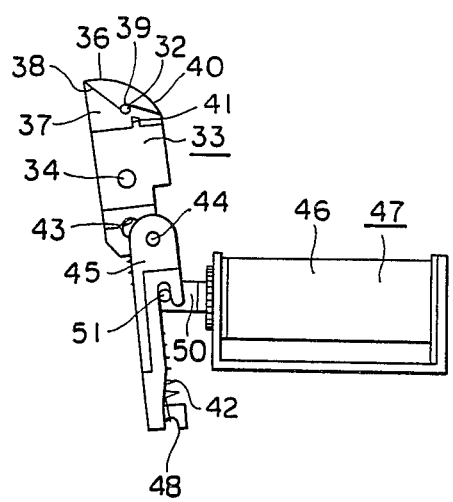
FIG. 10 is a schematic illustration showing a state when the door is locked, in the device of FIG. 1.
Figure 11:
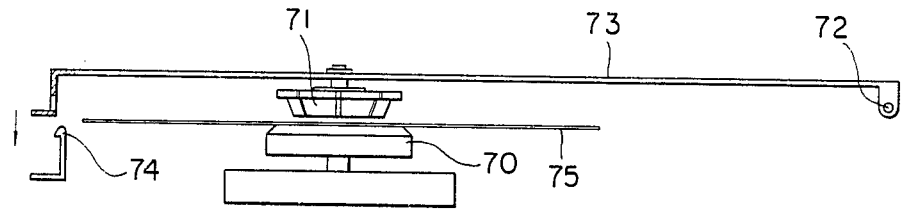
FIGS. 11 and 12 are schematic illustrations each showing a typical prior art floppy disk holding mechanism in a floppy disk drive.
Figure 12:
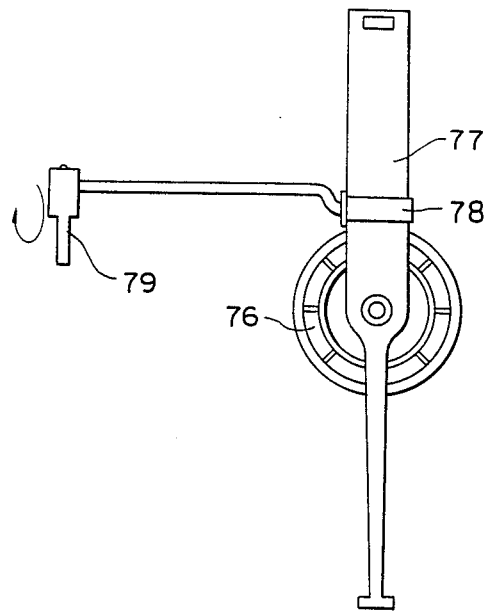

In the neighborhood of the stud 34 is disposed another stud 44 as fixedly mounted on the frame 1, and an arm 45 is pivotally supported by the stud 44, as best shown in FIGS. 7 and 10. The arm 45, together with an electromagnet 46 supported by the frame 1, constitutes a lock mechanism 47. That is, the arm 45 is formed with a hook portion 48 to which the other end of the spring 42 is engaged, and it is also provided at its center with a recess 49 for receiving therein a pin 51 fixedly provided on a plunger 50 of the electromagnet 46, which is energized to detract the plunger 50 in association with a read/write operation of the magnetic head 7 and the like. The plunger 50 is provided with an E ring 52 as best shown in FIG. 7. As shown in FIG. 1, a stopper 53 is provided to limit the scope of movement of the arm 45.

Referring again to FIG. 1, an ejection mechanism is disposed at the front side of the stepping motor 10. This ejection mechanism includes an ejection plate 55, which is slidable back and forth along a guide portion 54 formed in the frame 1, and a spring 56 as main components. The spring 56 extends between a stud 57 formed in the frame 1 near the front side thereof and an engaging member 58 formed at the front end of the ejection plate 55 as bent upwardly. As best shown in FIG. 6, when viewed sideways, the spring 56 extends aslantly with its end connected to the engaging member 58 located higher in position. At the far end of the ejection plate 56 is formed a jacket engaging member 59 as bent downwardly, which is brought into engagement with one end of a jacket containing therein the floppy disk 6 as the floppy disk 6 is inserted. The guide portion 54 is provided with a stepped portion 61 to which a front end surface 60 of the ejection plate 56 may be brought into engagement.

Figure 5:
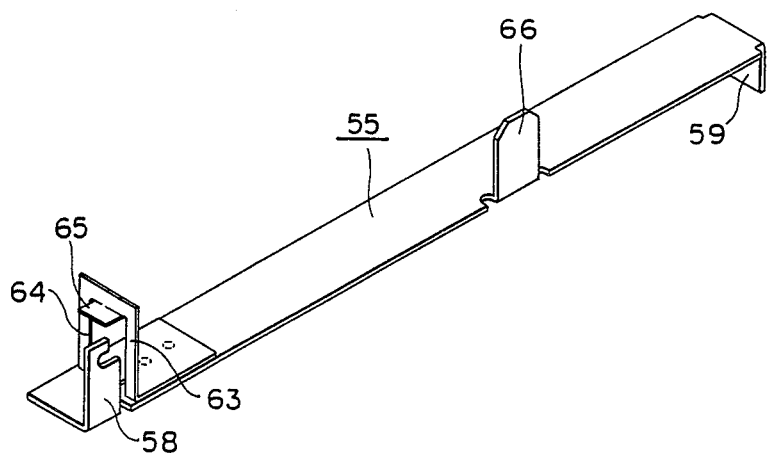
FIG. 5 is a perspective view showing an ejection plate of the device shown in FIG. 1.

The base portion 18 of the cone lift arm 17 is also provided with a tongue 62 at the location above the ejection plate 55 and projecting toward front. On the other hand, a leaf spring 63 is fixedly mounted on the ejection plate 55 in the vicinity of the engaging member 58 and as generally opposed to the tongue 62. As shown in FIG. 5, the leaf spring 63 is provided with an opening 64 and a projection 65 at the top of the opening 64. The ejection plate 55 is also provided with an ejection preventing member 66 as bent upwardly. The position and height of the ejection preventing member 66 is determined such that when the cone lift arm 17 is located at a normal position, the ejection preventing member 66 may move freely below the cone lift arm 17; on the other hand, when the cone lift arm is pivotally moved to an advanced position, it comes into engagement with the rear side end surface of the base portion 18 of the cone lift arm 17. As best shown in FIG. 2, the base portion 18 of the cone lift arm 17 is provided with a relief hole 67 corresponding in position to the ejection preventing member 66 of the ejection plate 55 in an inoperative state.

Figure 6A:
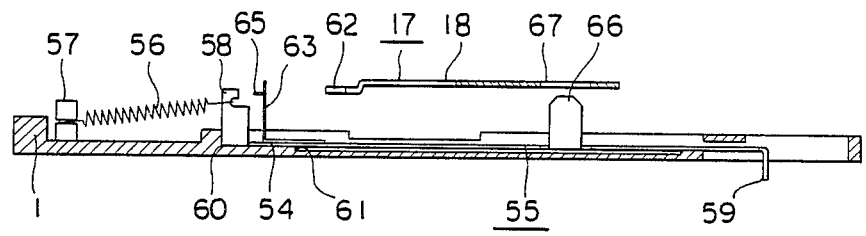
FIGS. 6(a)-6(c) are schematic illustrations each showing the state of one step in an ejection process of an floppy disk ejection mechanism provided in the device of FIG. 1.
Figure 6B:
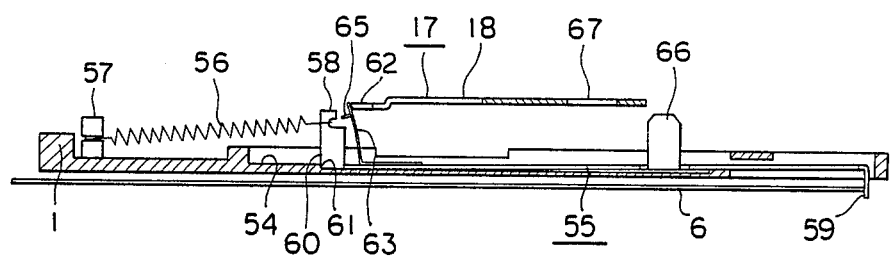

With the above-described structure, when the door 26 is closed after inserting the floppy disk 6 into a predetermined position, the floppy disk 6 is held securely between the driving hub 4 and the pressure cone 5 and thus set ready for operation. That is, in the first place, when the floppy disk 6 is inserted under the condition shown in FIG. 6(a), its jacket comes into engagement with the jacket engaging member 59 so that the ejection plate 55 is slidingly moved toward the rear side of the frame 1 against the force of the spring 56. When the ejection plate 55 has reached a predetermined position, its front end surface 60 comes into engagement with the stepped portion 61 as shown in FIG. 6(b) so that the movement of the ejection plate 55 becomes restrained and the floppy disk 6 is set in position. It is to be noted that the engagement between the front end surface 60 and the stepped portion 61 is securely maintained due to a downward force component of the recovery force of aslantly oriented spring 56. Also as shown in FIG. 6(b), when the ejection plate 55 is set in position, the leaf spring 63 fixedly mounted on the ejection plate 55 comes into abutment against the tongue 62 of the cone lift arm 17 so that the leaf spring 63 becomes resiliently bent in the direction opposite to the direction of inserting the floppy disk 6. Such a deflection in the leaf spring 63 applies a downwardly directed force to the ejection plate 55, which insures the engagement between the front end surface 60 and the stepped portion 61. Accordingly, the ejection plate 55 may be maintained as engaged with the stepped portion 61 even without presence of the downward force component applied by the spring 56.

Figure 3A:
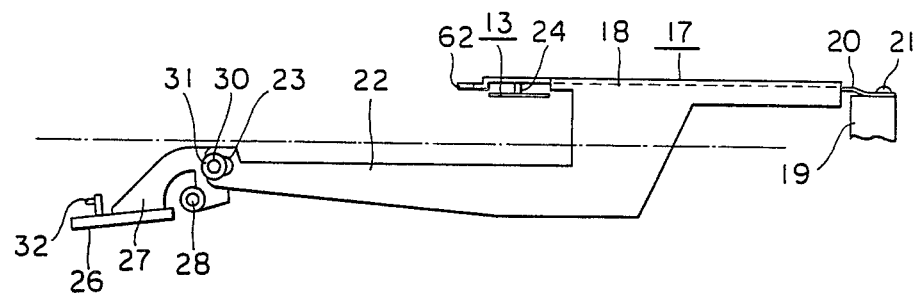
FIGS. 3(a) and 3(b) are schematic illustrations showing the operative association between the cone lift arm and the door shown in FIG. 2 at two extreme positions.
Figure 3B:
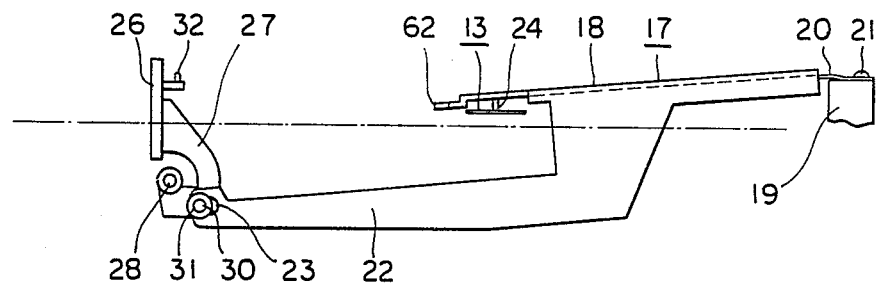

Upon completion of insertion of the floppy disk 6 as described above, the door 26 is closed as pivoted from the condition shown in FIG. 3(a) to the condition shown in FIG. 3(b). It is to be noted that a one-dotted line shown in each of FIGS. 3(a) and 3(b) indicates the disk surface of the floppy disk 6 when set in position. As the door 26 is pivoted to the closed position, the pin 30 moves downward as pivoted around the stud 28 so that the cone lift arm 17 pivots counterclockwise around the leaf spring 20 or screw 21 in association with the closing motion of the door 26 since the pin 30 is in engagement with the notch 23 of the cone lift arm 17. Such a downward movement of the cone lift arm 17 causes the leaf spring 13 to be pressed downward so that the leaf spring 13 moves downward to bring the pressure cone 5 in pressure contact with the hub 4 thereby securely holding the floppy disk 6 therebetween. Use of such a door 26 is preferred because it allows to obtain a large stroke of movement. That is, when the directly connected D.C. motor 2 is used, since the motor 2 requires a relatively large installation space as compared with the case in which a belt driving mechanism is used, the scope of movement allowed for the cone lift arm 17 is smaller when the directly connected D.C. motor 2 is used for a given device size, and, thus, it is ordinarily difficult to provide an actuating member having a large stroke of movement. Moreover, since the movement of the door 26 is directly transmitted to the cone lift arm 17, it requires only a low level operating force. Further, an interlink structure between the door 26 and the cone lift arm 17 is comprised of the notch 23 and the pin 30, which is quite simple in structure, and any additional complex link mechanism is not required. It should be appreciated that the door 26 also has a function of an actuating member of the cone lift arm 17.

Figure 4A:
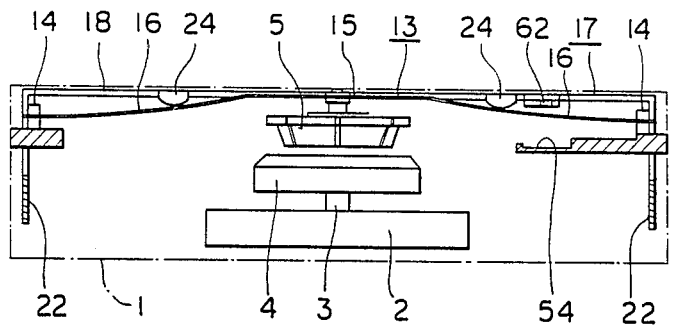
FIGS. 4(a) and 4(b) are schematic illustrations showing a state when a floppy disk is not mounted and a state when a floppy disk is mounted, respectively, in the device of FIG. 1.
Figure 4B:
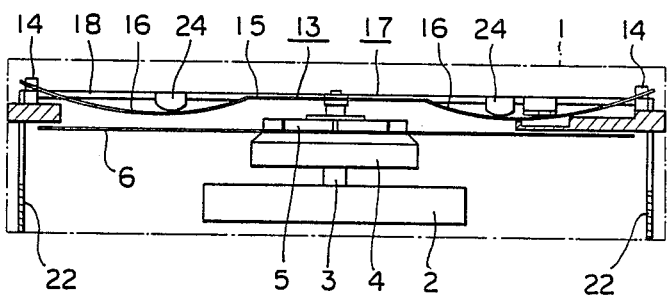

When the cone lift arm 17 moves downward as actuated by the closing motion of the door 26 as set forth above, the leaf spring 13 becomes deflected, in particular its inclined portions 16, 16. Since both ends of the leaf spring 13 are supported, no lateral motion or torsional motion is generated in the leaf spring 13 when so deflected as pushed at the symmetric positions with respect to the cone 5 by the pair of pressure projections 24, 24 of the cone lift arm 17. When the leaf spring 13 is so deflected, the pressure cone 5 mounted at the flat portion 15 moves downward translationally toward the driving hub 4. Of importance, the structure of the present invention allows to prevent the pressure cone 5 from being inclined when moved toward the driving hub 4 so that there is no danger of damaging the edge of the center hole of the floppy disk 6. In the condition where the floppy disk 6 is securely held as shown in FIG. 4(b), the resilient recovery force of the leaf spring 13 itself is used as a pressure force for securely holding the floppy disk 6 and this force is on the order of 2 Kg. Accordingly, it is not at all necessary to provide a coil spring around the shaft of the cone 5. Besides, because the pressure application points are defined on the inclined portions 16, 16 of the leaf spring 13, it is not necessary to locate the cone lift arm 17 farther away from the leaf spring 13 even if the downwardly bent pressure projections 24, 24 are integrally formed in the cone lift arm 17. Stated another way, the cone lift arm 17 and the leaf spring 13 may be located closer to each other, which can contribute to making the entire device compact, in particular flat, in size.

Figure 6C:
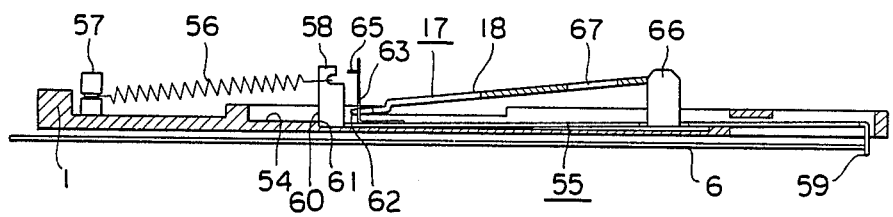

On the other hand, during the downward movement of the cone lift arm 17, the tongue 62 of the cone lift arm 17 slides along the leaf spring 63 to be received inside of the opening 64, whereby the leaf spring 63 returns to its upright position, and, thus, the tongue 62 now moves downward within the opening 64, as shown in FIG. 6(c). In the condition shown in FIG. 6(c), the base portion 18 of the cone lift arm 17 is so located to be engageable with the ejection preventing member 66 of the ejection plate 55. Under the condition that an operative condition is established after inserting the floppy disk 6 and closing the door 26, even if the ejection plate 55 becomes disengaged from the stepped portion 61 due to application of unexpected shocks or the like, the ejection plate 55 would not carry out an unwanted ejection operation because the base portion 18 of the cone lift arm 17 is engaged with the ejection preventing member 66 of the ejection plate 55. As a result, the jacket engaging member 59 of the ejection plate 55 is prevented from applying an undesired force to the jacket of the floppy disk 6, and, therefore, no excessive force will be created between the floppy disk 6 in rotation and its jacket, thereby allowing to prevent the floppy disk 6 from being damaged. When the door 26 is closed with the condition in which no floppy disk 6 is set in position as shown in FIG. 6(a), the jacket engaging member 66 will be received in the relief hole 67 formed in the cone lift arm 17. However, if it is attempted to close the door 26 with the floppy disk 6 incompletely inserted, the ejection preventing member 66 will come into abutment against the cone lift arm 17 thereby prohibiting the closure of the door 26.

When the door 26 is opened after a read/write operation, the cone lift arm 17 moves upward to return to its original position and also the leaf spring 13 returns to its original position so that the floppy disk 6 is set free for removal. At the same time, the ejection plate 55 is disengaged from the stepped portion 61 and pulled by the spring 56 so that the floppy disk 6 becomes ejected. Described more in detail as to the process of floppy disk ejection, the tongue 62 of the cone lift arm 17 first moves upward from the position indicated in FIG. 6(c) and when it comes to be engaged with the projection 65 to lift the forward end of the ejection plate 55, the front end surface 60 is disengaged from the stepped portion 61.

Figures 9A, 9B, 9C:
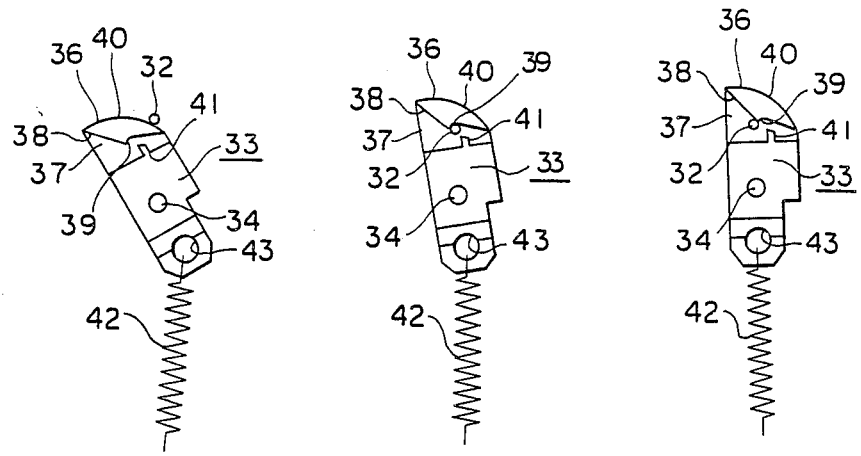
FIGS. 9(a)-9(c) are schematic illustrations useful for explaining the operation of the latch shown in FIG. 8.

A latching operation or one-way motion of the door 26 will now be described. In the first place, FIG. 7 illustrates the condition in which the door 26 starts to be closed and thus its pin 32 comes into engagement with the outer peripheral surface 36 of the latch 33. A further pivotal motion of the door 26 causes the pin 32 to push the latch 33; however, since the latch 33 cannot move rewardly, or in the downward direction in FIG. 7, due to the presence of the stud 34, the latch 33 starts to pivot around the stud 34 counterclockwise with the pin 32 in contact with the outer peripheral surface 36 as shown in FIG. 9(a). Then, a still further pivotal motion of the door 26 causes a further counterclockwise pivotal motion of the latch 33 until the pin 32 enters into the recess 37 by moving around the edge of the outer peripheral surface 36 by means of the spring 42. When the door 26 is pushed to its limit, the pin 32 comes to be engaged with the pin detent portion 41. Accordingly, the pin 32 now residing in the recess 37 is prevented from running over the latching portion 39. When the door 26 is set free with the operator removing his or her hand therefrom, the pin 32 comes to be latched at the latching position 39 as shown in FIG. 9(b). In this state, the spring 42 is located to the left of a line passing through the stud 34 and the hole 43 so that the spring 42 applies a force to the latch 33 to tend to rotate it clockwise. Under such a latching condition, when the door 26 is pushed again, the pin 32 moves away from the latching portion 39 toward the pin detent portion 41 so that the pin 32 becomes unlatched and starts to slide along the inner peripheral surface 38 toward the original position under the force of the spring 42 as shown in FIG. 9(c), thereby letting the door 26 to be opened. In this manner, the closing and opening operation of the door 26 may be carried out in a one-way motion quite smoothly with high operability without requiring complication in structure and high cost.

It will now be described with particular reference to FIG. 10 as to the case in which the door 26 is pushed with the latch 33 in a latched condition as shown in FIG. 9(b) because the magnetic head 7 is in reading or writing operation. In this case, since the electromagnet 46 is energized, the plunger 50 is retracted so that the arm 45 is pivoted counterclockwise around the stud 44 through the interconnection between the pin 51 and the recess 49 thereby causing the hook portion 48 located to the right over a predetermined distance in FIG. 10. As a result, the hook portion 48 comes to be located on or to the right of a straight line passing through the stud 34 and the hole 43, or the line of extension of the spring 42, so that the force applied by the spring to the latch 33 now tends to pivot the latch 33 counterclockwise. Under the condition, even if the door 26 is pushed, the pin 32 moves away from the latching portion 39 only temporarily and the latch 33 does not rotate. Thus, when the door 26 is again set free, the pin 32 again comes into engagement with the latching portion 39 thereby maintaining a latched state. Consequently, even if use is made of a one-way motion system, while a reading or writing operation is in progress, a latched state is maintained by the lock mechanism 47 thereby allowing to prevent undesired opening of the door 26 from occurring.

Next, a consideration will be given as to the point of making the device as a whole as flat as possible. In the case where use is made of the D.C. motor 2 as in the present embodiment, as shown in FIG. 4(a), there must be a gap between the motor 2 and the driving hub 4 and a stroke or moving distance of the pressure cone with respect to the driving hub 4 at minimum as factors contributing to the thickness of device. In the present embodiment, since the pressure cone 5 is mounted on the flat portion 15 of the leaf spring 13 and the supporting portions of spring 13 are located lower in level than the flat portion 15 due to the provision of the inclined portions 16, 16, the leaf spring 13 does not contribute much to the thickness of device. Moreover, since the cone lift arm 17 for pressing the leaf spring 13 is so structured to press the inclined portions 16, 16 of the leaf spring 13 with its pressure projections 24, 24, its base portion 18 may be located approximately at the same level as the flat portion 15 and thus the cone lift arm does not contribute much to the thickness of device either. Incidentally, since the cone lift arm 17 in the present embodiment is fabricated by press forming, it is made thinner, which is advantageous in making a flat disk drive. Although the cone lift arm 17 is thin in its thickness, it has a reasonable overall strength because of presence of the vertical portions 22, 22 which are integrally formed with the base portion 18 as bent downwardly. If a wide range of movement is allowed for the cone lift arm 17, a resulting disk drive will have a large thickness. In the present embodiment, however, the stroke allowed for the cone lift arm 17 is set as small as possible and use is made of the pivotally movable door 26 having a relatively large stroke of movement, whereby the door 26 is operatively connected to the cone lift arm 17. Further, the latch 33 for latching the door 26 is so structured that its two dimensional profile is important, so that it may be made relatively thin without causing any operational difficulties.

Figure 13:
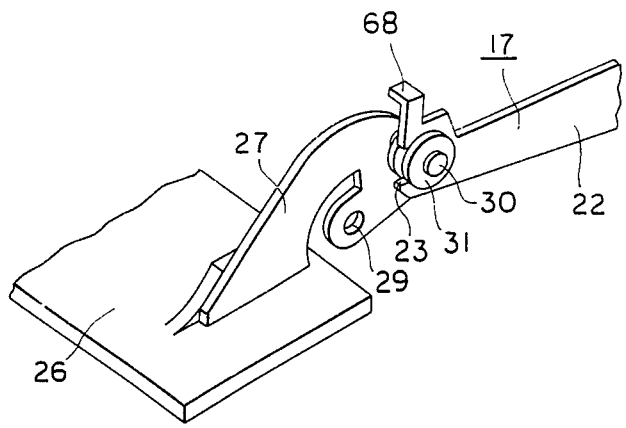
FIG. 13 is a fragmentary, perspective view showing another embodiment of the present invention.
Figure 14:
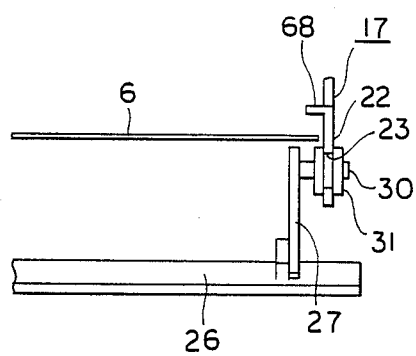
FIG. 14 is a front view of the structure shown in FIG. 13.
Figure 15A:
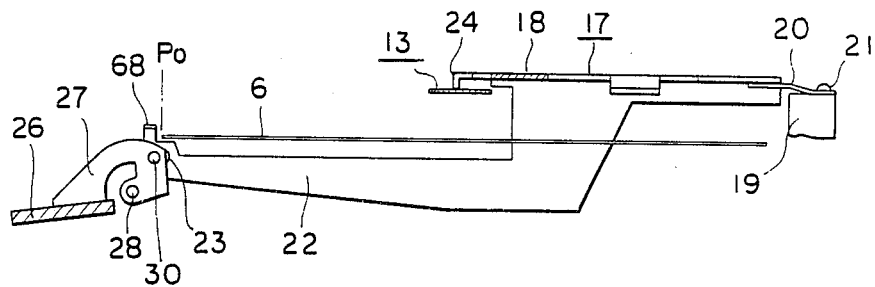
FIGS. 15(a)-15(c) are schematic illustrations useful for explaining the operation of the structure shown in FIGS. 13 and 14.

Another embodiment of the present invention will now be described with reference to FIGS. 13–15. As best shown in FIG. 13, a feature of this embodiment resides in the provision of a pawl 68 at the forward end of each vertical portion 22 of the cone lift arm 17. The pawl 68 provided at top tip end of the vertical portion 22 extends inwardly. FIG. 15(a) illustrates the condition in which the floppy disk 6 has been properly set in position. Under the condition, the pawl 68 is located somewhat to the left in FIG. 15(a) of the front end of a jacket housing the floppy disk 6, which position is indicated by the one-dotted line Po. When viewed from the front, as shown in FIG. 14, the pawl 68 has a portion which overlaps the jacket housing the floppy disk 6. Of course, the pawl 68 is so structured that it does not overlap with the arm 27. In addition, the pawl 68 is located at the same side with the pressure cone 5 with respect to the floppy disk 6, but it is so structured that its position is lower than the pressure cone 5.

Figure 15B:
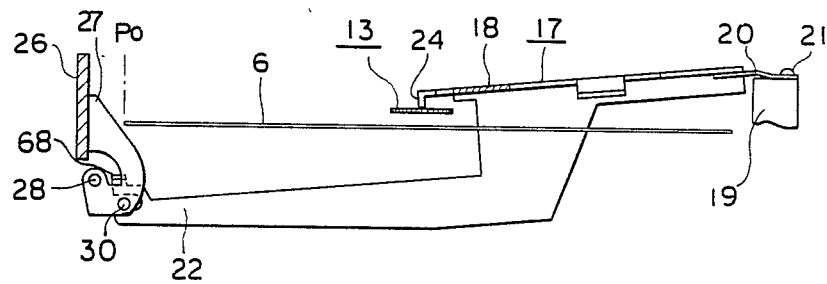

With the above-described structure, if the floppy disk and thus its jacket is set properly in position as shown in FIG. 15(a) with the front end of the jacket located to the right of the pawl 68 in FIG. 15(a) and thus inwardly of the pawl 68 with respect to the direction of insertion, there will be no interference between the pawl 68 and the jacket of the floppy disk 6. Under the circumstances, when the door 26 is closed, the floppy disk 6 becomes securely held between the pressure cone 5 and the driving hub 4 for operation as shown in FIG. 15(b).

Figure 15C:
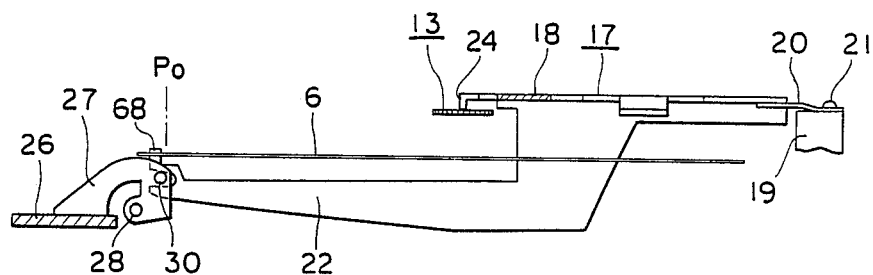

On the other hand, FIG. 15(c) illustrates the condition in which the floppy disk 6 is not properly set in position because the floppy disk 6 has not been fully inserted with the front end of its jacket still located to the right of the normal position Po. Under the condition, when the door 26 is attempted to be closed to move the cone lift arm 17 downwardly, there will be an interference between the pawl 68 and the jacket of the floppy disk 6 on the way. Thus, the cone lift arm 17, in effect, is prevented from moving downward and thus the door 26 is prevented from being closed. Even if the pawl 68 engages with the jacket housing the floppy disk 6, no damage will be imparted to the floppy disk 6 itself because that portion of the jacket which is engaged by each of the pawls 68, 68 provided on both sides is most unlikely to contain the floppy disk 6. In other words, the floppy disk 6 is circular in shape and its jacket is normally square in shape and the pawls 68, 68 are so disposed to engage with side peripheral portions near the front end, so that the pawls 68, 68 will engage those portions of the jacket where the floppy disk 6 is absent. As described above, since the door 26 is refrained from closing whenever the floppy disk 6 is not properly set in position, the pressure cone 5 will not come into engagement with the floppy disk 6 in a misaligned state. This is important because the central hole of the floppy disk 6 can be positively prevented from being damaged by the pressure cone 5 as the pressure cone 5 is allowed to come down only when the floppy disk 6 is properly aligned with the pressure cone 5.

Figure 16:
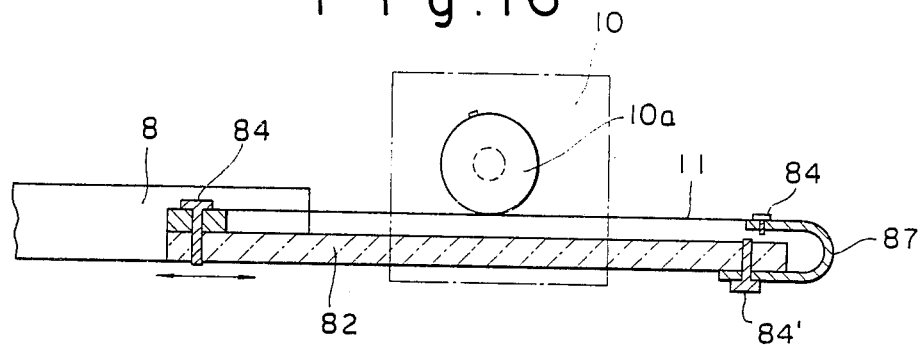
FIG. 16 is a schematic illustration showing a typical structure for mounting a driving belt for driving to move a magnetic head which may be applied to the device of FIG. 1.

FIG. 16 schematically illustrates a typical structure for mounting the driving belt 11 for driving to move the carriage 8 carrying thereon a magnetic head back and forth in the radial direction with respect to the floppy disk 6, which is applicable to the present invention. The structure shown in FIG. 16 includes the carriage 8 and a support member 82 fixedly mounted on the carriage 8. The support member 82 is provided with a curved leaf spring 87 as fixedly attached to its free end by means of a screw 84'. The steel belt is wound around a rotary shaft 10a of the stepping motor 10 with its one end fixed to the support member 82 by means of a screw 84 and its the other end fixed to the tip end of the curved leaf spring 87 by means of a screw 84. With such a structure, when the stepping motor 10 is driven to rotate, its rotational motion is translated into linear motion of the carriage 8 as indicated by the double-headed arrow through the rotary shaft 10a and the steel belt 11.

Figure 17:
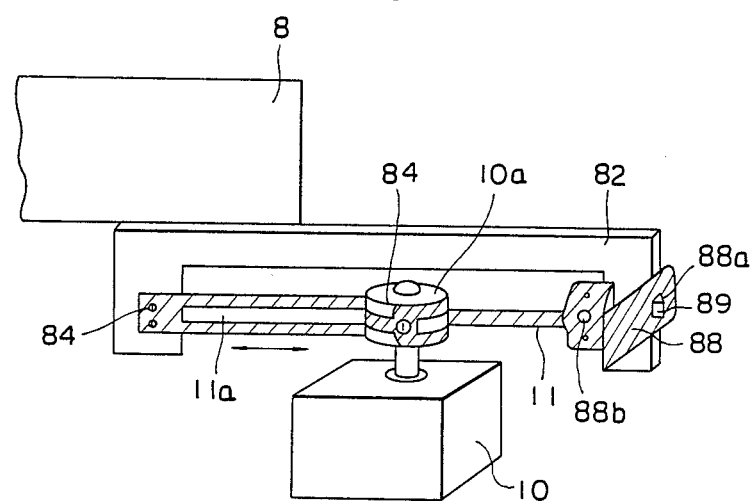
FIG. 17 is a schematic illustration showing one example of a modified structure for mounting a driving belt for driving to move a magnetic head which may be advantageously applied to the device of FIG. 1.
Figure 18:
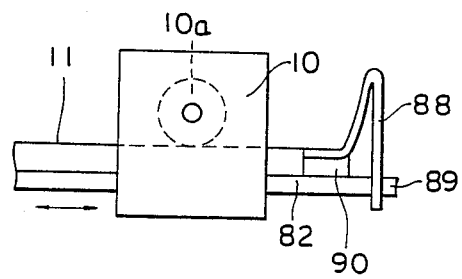
FIG. 18 is a fragmentary, plan view showing a portion of the structure shown in FIG. 17.
Figure 19:
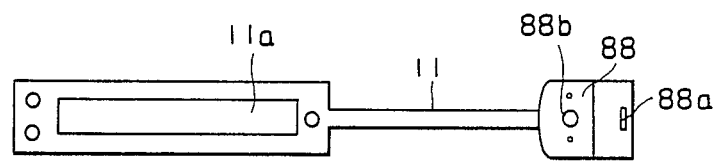
FIG. 19 is a plan view showing the overall structure of a steel belt employed in the structure shown in FIG. 17.

FIGS. 17 and 19 schematically illustrate another example of steel belt mounting structure. It is to be noted that like reference numerals indicate like elements as practiced throughout the present specification. As best shown in FIG. 19, the steel belt 11 of this embodiment has a particular structure such that the left half section of the steel belt 11 is formed with a slot 11a whose width in transverse direction is larger than the width of the right half section. A generally V-shaped leaf spring 8 having a relatively small spring constant is fixedly attached to the right end of the steel belt 11, for example, by spot welding or screw. An engaging hole 88a is provided at the forward end of the V-shaped leaf spring 88 which is fixedly attached to the free end of the steel belt 11 by spot welding at point 88b. The steel belt 11 is wound around the rotary shaft 10a of the stepping motor 10 and it is fixed to the rotary shaft 10 by means of a screw 84. The free end of the left half section provided with the slot 11a is fixedly attached to the support member 82 by means of screws 84, and the free end of the right half section is fixedly attached to one end of the V-shaped leaf spring 88 whose the other end is provided with the engaging hole 88a which is engaged with a projection 89 formed at the forward end of the support member 82. As shown in FIG. 18, a spacer 90 is provided as sandwiched between the V-shaped leaf spring 88 and the support member 82 so as to locate the steel belt 11 in a proper position.

Figure 20:
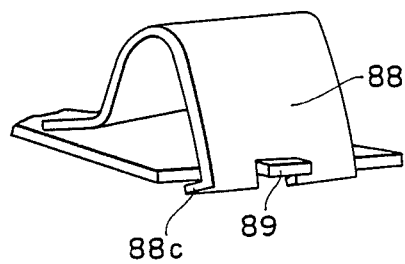
FIG. 20 is a fragmentary, perspective view showing an alternative structure of the engaging portion of the steel belt applicable to the structure shown in FIG. 17.
Figure 21:
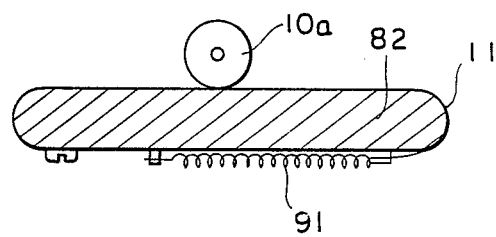
FIG. 21 is a schematic illustration showing an alternative structure of the resilient portion of the steel belt applicable to the structure shown in FIG. 17.

FIG. 20 illustrates a modification of the V-shaped leaf spring 88. In this embodiment, an engaging hook 88c is formed at the forward end of the V-shaped leaf spring 88 instead of the engaging hole 88a in the previous embodiment. FIG. 21 illustrates a further modification in which use is made of a coil spring 91 instead of the V-shaped leaf spring 88.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A floppy disk drive having a slot through which a floppy disk may be inserted in use, comprising:
   a driving hub having a rotation axis;
   a pressure cone movable between a disengaged position, in which it is spaced from the driving hub along the rotation axis of the hub, and an engagement position, in which it is closer to the hub and engages with a floppy disk and holds it in engagement with said driving hub;
   a leaf spring having a central portion carrying said pressure cone in an opposed relation to said driving hub and a pair of side portions which extends downwardly from the central portion in opposite directions when the pressure cone is in its disengaged position;
   a profiled plate provided to be movable between a first position and a second position, at which second position it depresses said side portions of the leaf spring to press said pressure cone into said engagement position thereof, said profiled plate including a pair of pressure projections each located above a corresponding side portion of said leaf spring, wherein the movement of said profiled plate from its first to its second position causes said pressure cone to move substantially linearly along the rotation axis of said driving hub, and wherein said pair of pressure projections press the corresponding side portions of said leaf spring when said plate is located at said second position thereof; and
   position control means operatively coupled to said profiled plate for controlling the position thereof.

2. A drive as in claim 1, further comprising a drive motor located below said driving hub, said driving motor having a rotary shaft to which said driving hub is directly and fixedly mounted.

3. A drive as in claim 1, wherein said pair of pressure projections are provided in said profiled plate symmetrically with respect to said pressure cone.

4. A drive as in claim 1, wherein said profiled plate includes a base portion extending generally parallel with the central portion of said leaf spring and provided with said pair of pressure projections projecting downwardly therefrom, and a pair of arms extending perpendicularly from both ends of said base portion, each of said arms being provided with first engaging means at its free end, and said position control means includes second engaging means engageable with said first engaging means.

5. A drive as in claim 4, wherein said first engaging means includes a notch formed at the free end of each of said arms and said second engaging means includes a pin engageable with said notch.

6. A drive as in claim 5, wherein said second engaging means further includes a grooved collar fitted onto said pin and said notch is in engagement with the groove of said collar.

7. A drive as in claim 4, wherein each of said arms comprises a pawl provided at the top of its free end, said pawls extending opposite to each other inwardly over a predetermined length and located, in use, just outside of the front end of a jacket which houses said floppy disk when said floppy disk is properly set in position.

8. A drive as in claim 1, wherein said position control means includes a pivotally supported door which closes said slot when located at a closed position and opens said slot when located at an open position, said door causing said profiled plate to be located at said first position when located at said open position, and causing said profiled plate to be located at said second position when located at said closed position.

9. A drive as in claim 1, further comprising ejecting means for causing said floppy disk to be automatically ejected through said slot to the exterior when said profiled plate is moved from said seocnd position to said first position by said position control means.

10. A drive as in claim 9, wherein said ejecting means includes a slidably movable ejection plate, biasing means for normally biasing said ejection plate toward an ejection direction, and restraining means for restraining the movement of said ejection plate, said ejection plate having a jacket engaging member engageable, in use, with a rear end of a jacket which houses a floppy disk, whereby when said floppy disk is inserted into the device through said slot, the rear end of said jacket engages with said jacket engaging member to thereby cause said ejection plate to be restrained by said restraining means.

11. A drive as in claim 10, wherein said ejection plate also has a releasing member engageable with said profiled plate, said ejection plate being released from said restraining means to move in said ejection direction under the influence of said biasing means when said profiled plate is caused to move from said second position to said first position by said position control means.

12. A drive as in claim 8, further comprising latching means for latching said position control means at a predetermined position when said floppy disk is in use for reading or writing operation.

13. A drive as in claim 12, wherein said door includes a pin partly planted therein, and said predetermined position is said closed position, and said latching means includes a pivotally supported latch engageable with said pin to thereby allow said door to be latched at said closed position.

14. A device as in claim 13, further comprising locking means for locking said latch when a floppy disk is in use.

15. A device as in claim 14, wherein said locking means includes an electromagnet which is energized to have said latch locked as long as a floppy disk is in use.

* * * * *